US 8,910,387 B2
Dec. 16, 2014

(12) United States Patent
Alliss

(54) STRING TRIMMER HEAD CONFIGURATION AND METHOD

(76) Inventor: George Everett Alliss, Bladenboro, NC (US)

( * ) Notice: Subject to any disclaimer, the term of this patent is extended or adjusted under 35 U.S.C. 154(b) by 550 days.

(21) Appl. No.: 12/428,453

(22) Filed: Apr. 22, 2009

(65) Prior Publication Data
US 2009/0260237 A1  Oct. 22, 2009

Related U.S. Application Data

(60) Provisional application No. 61/071,321, filed on Apr. 22, 2008.

(51) Int. Cl.
*A01G 3/06* (2006.01)
*A01D 34/416* (2006.01)

(52) U.S. Cl.
CPC ........ *A01D 34/4162* (2013.01); *A01D 34/4163* (2013.01)
USPC ............................. 30/276; 30/347; 242/597.4

(58) Field of Classification Search
USPC .......... 30/276, 272.1, 347, 285; 56/12.7, 295; 242/597.4
See application file for complete search history.

(56) References Cited

U.S. PATENT DOCUMENTS

| | | | |
|---|---|---|---|
| 4,203,212 A * | 5/1980 | Proulx | 30/276 |
| 4,259,782 A * | 4/1981 | Proulx | 30/276 |
| 4,566,189 A | 1/1986 | Muto | |
| 4,633,588 A * | 1/1987 | Pittinger, Jr. | 30/347 |
| 4,672,798 A * | 6/1987 | Ota | 56/12.7 |
| 5,060,384 A | 10/1991 | Everts | |
| 5,109,607 A | 5/1992 | Everts | |
| 5,765,287 A * | 6/1998 | Griffini et al. | 30/276 |
| 5,881,464 A | 3/1999 | Collins et al. | |
| 7,581,322 B2 * | 9/2009 | Proulx | 30/276 |
| 7,607,232 B2 * | 10/2009 | Pfaltzgraff | 30/276 |
| 7,640,668 B2 * | 1/2010 | Iacona | 30/276 |
| 7,797,839 B2 * | 9/2010 | Proulx | 30/276 |
| 7,882,642 B2 * | 2/2011 | Proulx | 30/276 |
| 7,979,991 B2 * | 7/2011 | Pfaltzgraff | 30/276 |

* cited by examiner

*Primary Examiner* — Omar Flores Sanchez
(74) *Attorney, Agent, or Firm* — Merek, Blackmon & Voorhees, LLC

(57) ABSTRACT

A bidirectional trimmer head assembly and the method of configuring the trimmer head assembly. The trimmer head assembly has a housing that attaches to a string trimmer machine. A spool is provided inside the housing. The spool rotates about an axis of rotation. The spool can move longitudinally along the axis of rotation between a first position and a second position. A ratcheting mechanism is provided between the trimmer head housing and the spool. When the spool is in one position, the ratcheting mechanism enables the spool to continuously rotate about the axis of rotation in the direction of or in the direction opposite that in which the trimmer head assembly spins to allow the spool to be fed out or dispensed regardless of the direction of rotation of the trimmer housing. The ratchet mechanism in a second postion prevents the spool from rotating relative to the housing.

22 Claims, 8 Drawing Sheets

STRING TRIMMER HEAD CONFIGURATION AND METHOD

RELATED APPLICATIONS

The present invention is a continuation-in-part of Provisional Patent Application No. 61/071,321, filed Apr. 22, 2008, entitled Combination Line Feed and Ratcheting Mechanism for Semi-Automatic Spool Trimmer Heads.

BACKGROUND OF THE INVENTION

1. Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2. Prior Art Description

String trimmer machines have been commercially sold for over a quarter of a century. In this period of time, there have been many variations to the design of the string trimmer machine and especially to the trimmer head.

The trimmer head is the part of the string trimmer machine that rotates. The trimmer head holds lengths of trimmer line that rotate with the trimmer head. The rotating trimmer line contacts and cuts vegetation as it spins.

Depending upon the make, model, and manufacturer of the string trimmer machine, the trimmer head rotates either clockwise or counterclockwise during operation. The mix in the current retail market is roughly evenly split between clockwise and counterclockwise rotating string trimmer machines.

There are many types of trimmer heads on the market. The most common types of traditional trimmer heads are the bump-feed trimmer head and the automatic-feed trimmer head. Both types of trimmer heads contain an internal spool that holds a reserve of wound trimmer line. As the trimmer line wears away, it can be replaced from the internal spool. In a bump-feed trimmer head, short lengths of line is released from the spool when the bottom of the trimmer head is impacted or "bumped" against a hard surface. In an automatic-feed trimmer head, a short length of line is released from the spool without the operator having to manually strike or bump the bottom of the trimmer head on the ground. Many mechanisms exist in the prior art for controlling the release of wound trimmer line from the internal spool of a trimmer head. Bump-activated trimmer heads are exemplified by U.S. Pat. No. 5,881,464 to Collins, entitled Line Head For Flexible Line Trimmer. Automatic-feed trimmer heads are exemplified by U.S. Pat. No. 5,060,384 to Everts, entitled Automatic Head For A Line Trimmer; U.S. Pat. No. 5,109,607 to Everts, entitled Automatic Line Trimmer Head; and U.S. Pat. No. 4,566,189 to Muto, entitled Filament Type Trimmer Apparatus Cutters.

The primary problem associated with such traditional trimmer heads is one of reloading. In order to replenish and reload new trimmer line into the trimmer head, the trimmer head must be disassembled and the internal spool removed. This process is often too difficult for many homeowners to complete successfully or even attempt.

Another common problem that often accompanies bump-feed trimmer heads, is the problem of line twisting string on the spool. Most bump-feed trimmer heads contain two lengths of trimmer line that extend from opposite side of the trimmer head. Bump-feed trimmer heads rely upon centrifugal forces to pull the trimmer lines from the spool. If the trimmer lines tangle, twist or become buried under subsequent windings, the trimmer lines will not dispense in the proper manner. The trimmer head must then be disassembled, the trimmer string unwound and again rewound in the proper manner before the trimmer head will again work as designed. Furthermore, whenever the trimmer string supply is exhausted, the trimmer head must be manually disassembled. The spool is removed and rewound with a new supply of trimmer line. The spool is then reassembled back into the trimmer head. This process is difficult, labor intensive and highly time consuming.

Another problem associated with traditional automatic-feed trimmer heads is the complexity and reliability of the release mechanism that draws trimmer line from the spool when needed. As many homeowners will attest, the mechanism for releasing the trimmer line is usually the first part of a string trimmer machine that fails to work.

Yet another disadvantage of some prior art trimmer heads is that they are designed to rotate in only a single direction. Accordingly, a trimmer head designed for a clockwise trimmer will not work on a counterclockwise trimmer. Furthermore, the parts from a clockwise trimmer head cannot be interchanged with any of the parts from a counterclockwise trimmer head. This requires a trimmer head manufacturer to create two sets of manufacturing tools, one for clockwise trimmer heads and one for counterclockwise trimmer heads. This significantly increases the cost associated with manufacturing trimmer heads. Furthermore, it results in each trimmer head design having two different models, one for clockwise rotation, and one for counterclockwise rotation.

A need therefore exists for a string trimmer head that has an inexpensive yet reliable mechanism for dispensing trimmer line when needed. A need also exists for a string trimmer head that dispenses trimmer line with less likelihood that the trimmer line will tangle, twist, or bind. Furthermore, a need exists for a trimmer head that does not have to be disassembled to have new string added. Lastly, a need exists for a trimmer head that can be manufactured inexpensively with few operating parts and can operate either as a uni-directional of bi-directional trimmer head on trimmer machines. These needs are met by the present invention as described and claimed below.

SUMMARY OF THE INVENTION

The present invention is a trimmer head assembly and the method of configuring the trimmer head assembly. The trimmer head assembly attaches to a string trimmer machine. The trimmer head assembly holds lengths of trimmer line that cut vegetation when the trimmer head assembly spins and contacts the vegetation.

The trimmer head assembly has a housing that attaches to the string trimmer machine. A spool is provided inside the housing. The spool rotates about an axis of rotation. The spool can move longitudinally along the axis of rotation between a first position and a second position. A ratcheting mechanism and an indexing mechanism are provided between the trimmer head housing and the spool. When the spool is in its first position, the ratcheting mechanism enables the spool to continuously rotate about the axis of rotation in the direction opposite that in which the trimmer head assembly spins. The ratcheting mechanism also prevents the spool from rotating within the housing in the same direction in which the trimmer head is spinning.

Using the ratcheting mechanism, new trimmer line can be wound onto the spool, simply by anchoring the trimmer line to the spool and manually turning the spool. No disassembly is required.

In operation, an activation mechanism is provided for momentarily moving the spool from its first position in the housing to its second position. The activation mechanism can be automatic or bump activated. Once momentarily in its second position, the indexing mechanism enables the spool to turn so that a small length of the trimmer line to unwind from the spool.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention trimmer head can be embodied in many ways, only two exemplary embodiments are illustrated. These embodiments are selected in order to set forth the best modes contemplated for the invention. The illustrated embodiments, however, are merely exemplary and should not be considered a limitation when interpreting the scope of the appended claims.

Figure 1:
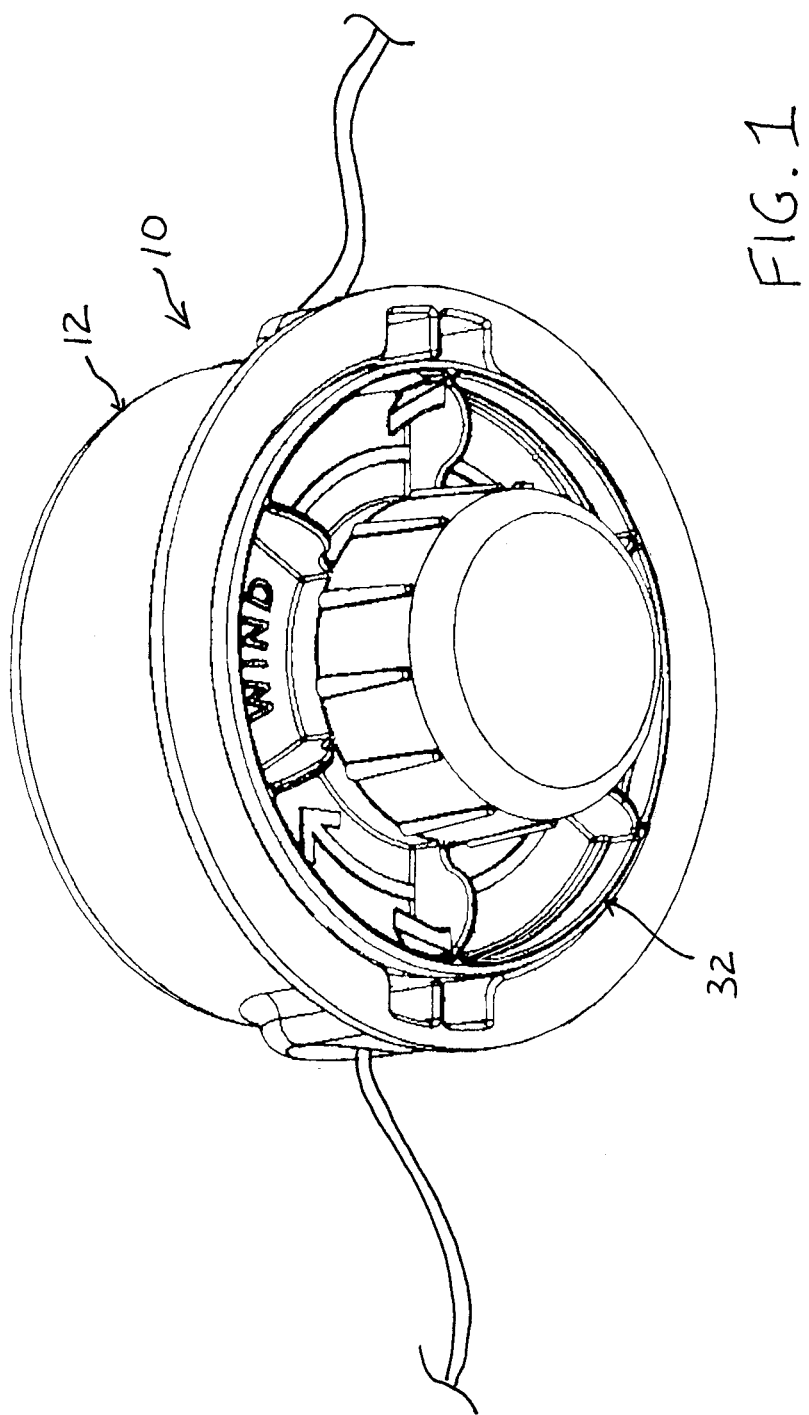
FIG. 1 is a perspective view of an exemplary embodiment of a trimmer head assembly.
Figure 2:
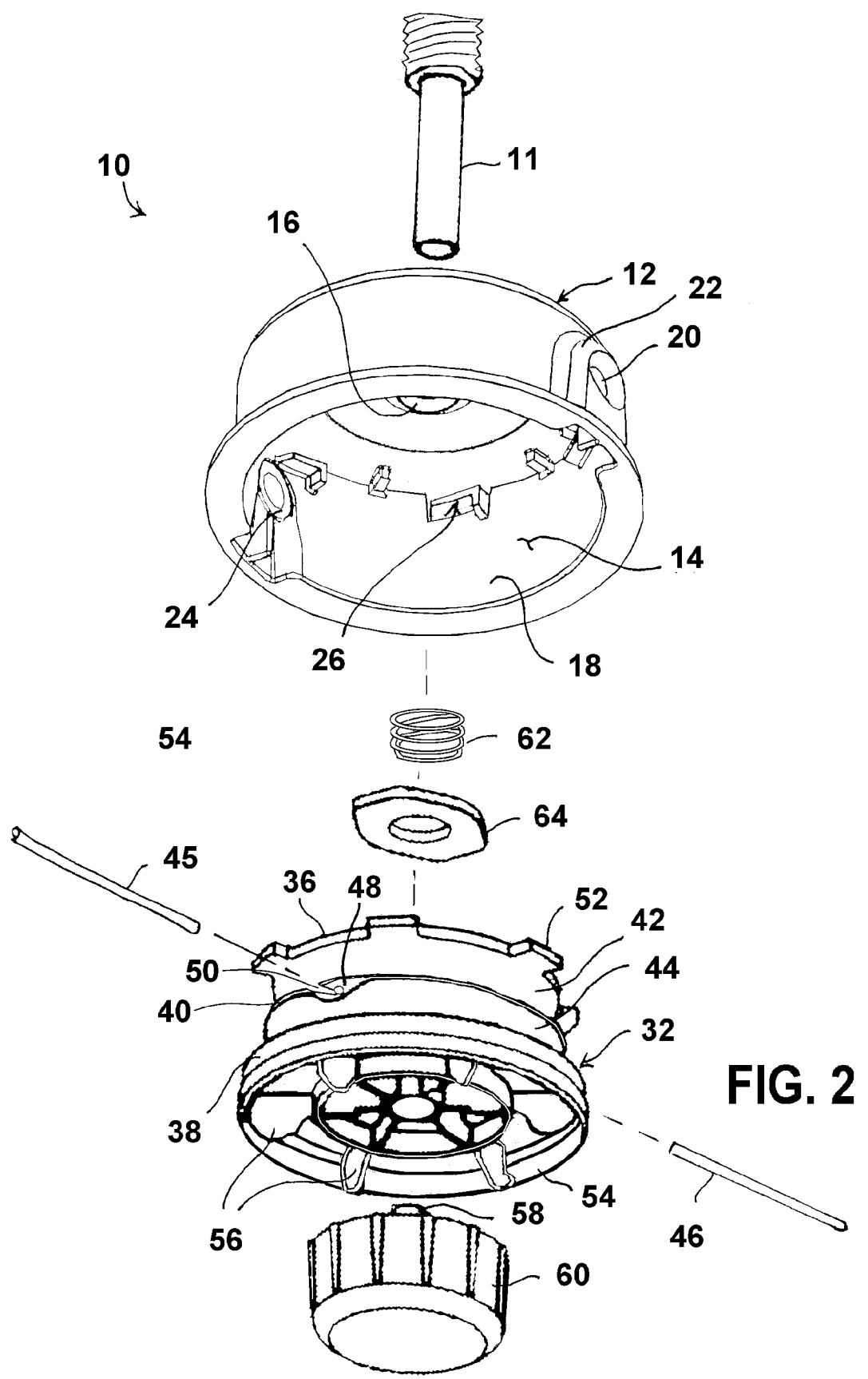
FIG. 2 is an exploded view of the embodiment of FIG. 1.

Referring to FIG. 1 and FIG. 2, a first exemplary trimmer head assembly 10 is shown. The trimmer head assembly 10 attaches to the drive shaft 11 of a string trimmer machine (not shown), which may rotate the trimmer head assembly 10 either clockwise or counterclockwise depending upon the model of the string trimming machine being used.

Figure 3:
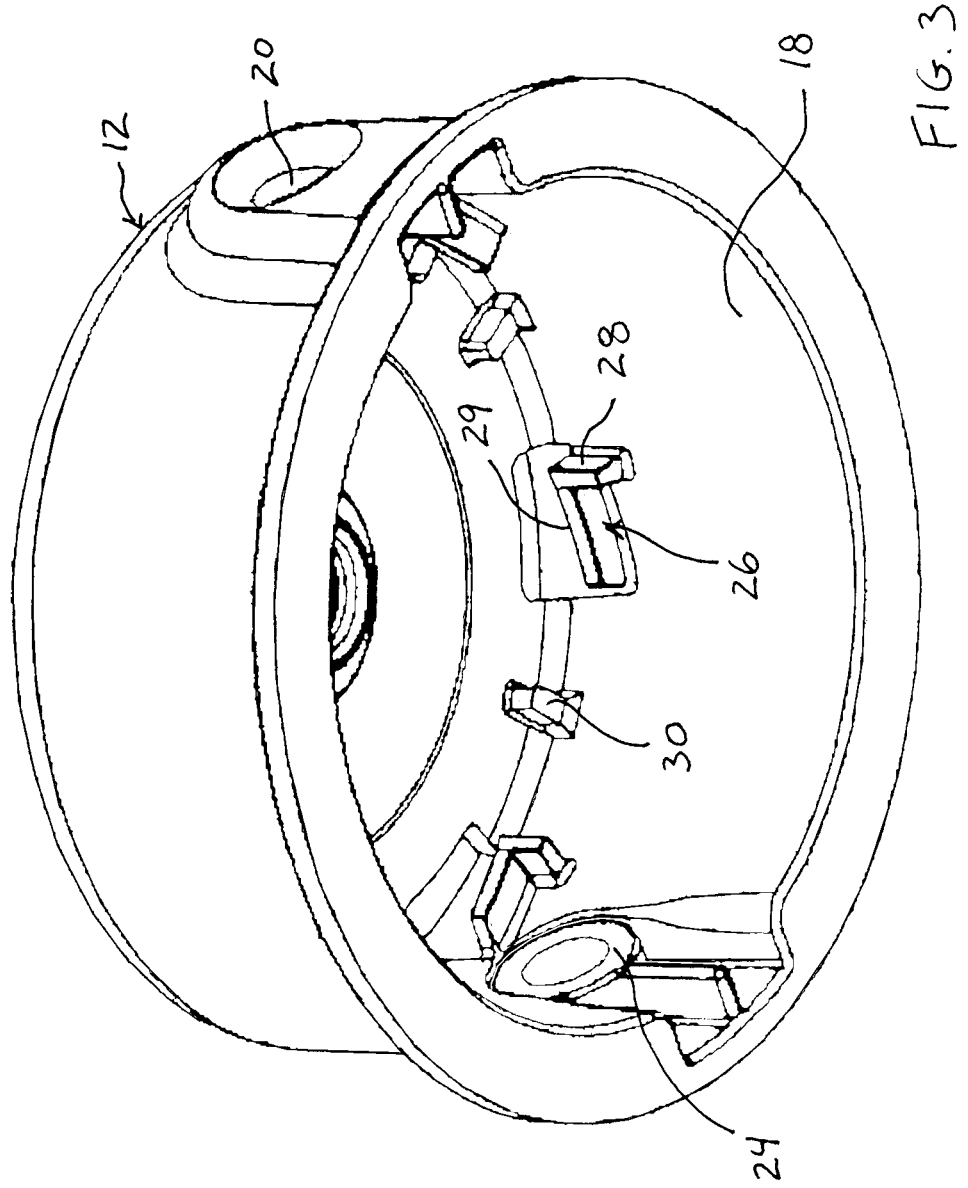
FIG. 3 is an enlarged perspective view of the housing used in the exemplary embodiment.

Referring to FIGS. 1 and 2 now in conjunction with FIG. 3, it can be seen that the trimmer head assembly 10 has a primary housing 12. The housing 12 defines an open interior 14. The top of the housing 12 is closed, except for a small threaded mounting hole 16 that permits the passage of the drive shaft 11 into the housing 12 and couples the housing 12 to the string trimmer machine. The bottom of the housing 12 is open, therein providing easy access to the open interior 14 of the housing 12. The periphery of the open interior 14 of the housing 12 is defined by a cylindrical wall 18.

At least two string ports 20 are formed through the cylindrical wall 18. The string ports 20 are diametrically opposed. If more than two string ports 20 are provided, it will be understood that the various string ports will be symmetrically disposed. The housing 12 may contain thickened regions 22 about each of the string ports 20 to compensate for the wearing of plastic at the string ports 20. Furthermore, optional eyelets 24 may be provided within the string ports 20. The eyelets 24 can be made from metal, ceramic, or a hard plastic that resists contact wear better than does the material of the remainder of the housing 12.

A plurality of ramp projections 26 extend into the open interior 14 of the housing 12 from the cylindrical wall 18. The ramp projections 26 are symmetrically disposed at the same height around the cylindrical wall 18. Each ramp projection 26 includes a vertical segment 28 and a sloped segment 29. The vertical segment 28 and the sloped segment 29 combine to form a wedge or ramp shape.

A stop projection 30 extends from the cylindrical wall 18 between each of the ramp projections 26. The stop projections 30 are positioned higher on the cylindrical wall 18 than are the ramp projections 26. The purpose of the interposed stop projections 30 and ramp projections 26 will be later explained in detail.

Figure 4:
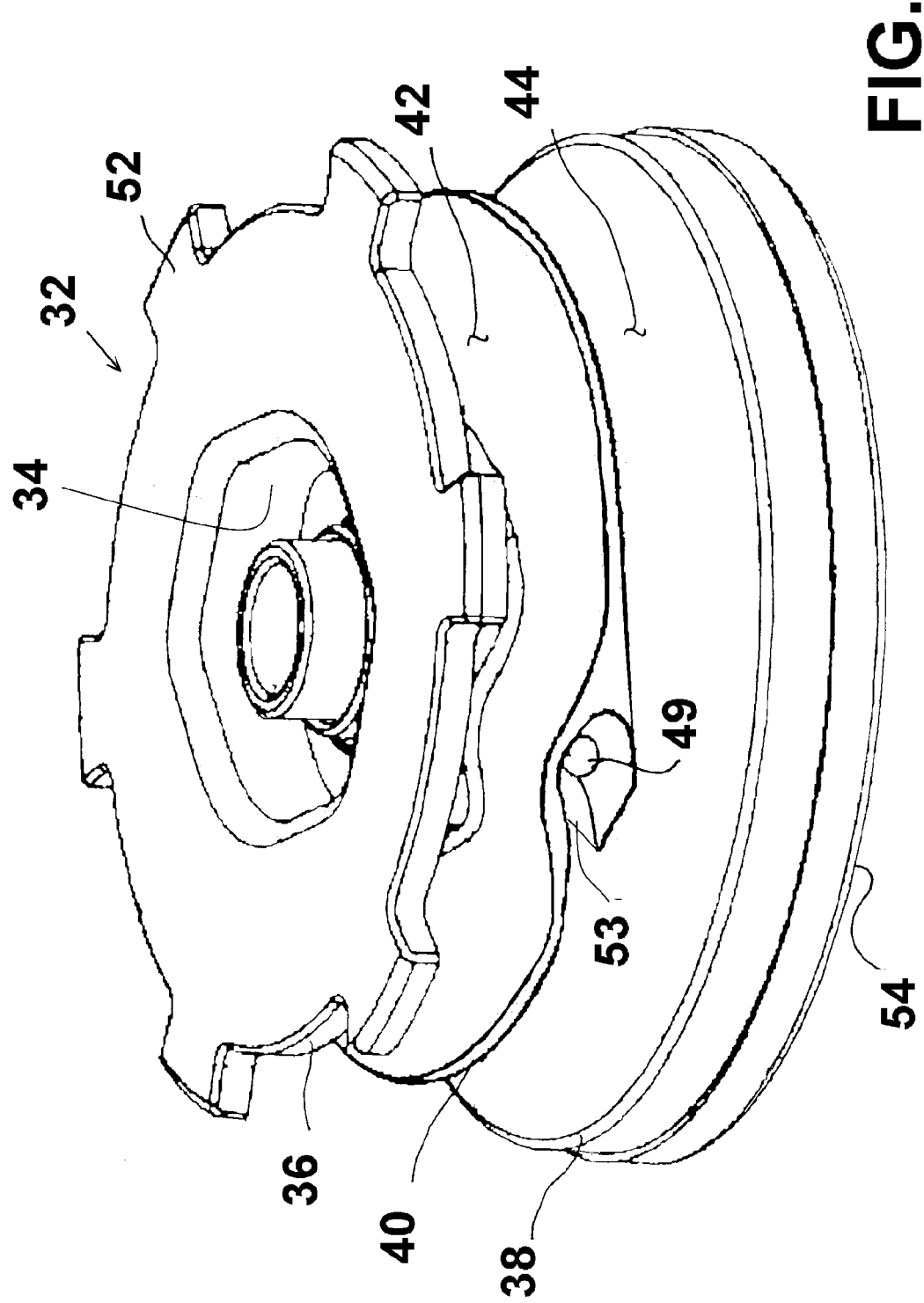
FIG. 4 is a reverse perspective view of a spool used in the exemplary embodiment.

Referring now to FIG. 1 and FIG. 2 in conjunction with FIG. 4, it can be seen that a complex spool 32 is held within the open interior 14 of the housing 12. The spool 32 rotates about an imaginary axis of rotation 41. The spool 32 has a cylindrical hub 34 that supports a top flange 36, a bottom flange 38, and a central flange 40. Accordingly, the spool 32 contains two separate winding chambers 42, 44 where one or two lengths of trimmer line 45, 46 can wind around the cylindrical hub 34. An upper winding chamber 42 is disposed between the top flange 36 and the central flange 40. A lower winding chamber 44 is disposed between the central flange 40 and the bottom flange 38.

Two line-feed conduits 48, 49 extend into the central flange 40. One anchor conduit 48, shown in FIG. 2, has a side relief 50 that leads into the upper winding chamber 42. The opposite line-feed conduit 49, shown in FIG. 3, has a side relief 53 that leads into the lower winding chamber 44. The line-feed conduits 48, 49 are used to receive and engage the ends of two lengths of trimmer line 45, 46. In this manner, when the spool 32 is rotated, the two lengths of trimmer line 45, 46 will either separately wind onto, or unwind from, the upper and lower winding chambers 42, 44, respectively.

Within each of the feed-line conduits 48, 49 is a configuration for receiving, gripping and securing the ends of the trimmer lines 45, 46. In this manner, the ends of the trimmer lines 45, 46 rotate with the spool 32 therein allowing the trimmer lines 45, 46 to wind onto the spool 32.

The top flange 36 on the spool 32 is generally configured as a cogwheel. Cog projections 52 radially extend from the top flange 36 at symmetrical points. The number of cog projections 52 on the top flange 36 is equal to the number of ramp projections 26 within the housing 12.

The bottom flange 38 on the spool 32 has a complex face surface 54 that faces away from the top flange 36 and central flange 40. The face surface 54 of the bottom flange 38 is molded with tabs 56 to facilitate the manual engagement and turning of the spool 32.

The spool 32 is affixed to the drive shaft 11 of the string trimmer machine by a mounting bolt 58. In the shown embodiment, the mounting bolt 58 is attached to a bump knob 60. It will be understood that the mounting bolt 58 may pass through the bump knob 60 and need not be part of the bump knob 60, as is illustrated. Likewise, the bump knob 60 is shown as an element that is separate and distinct from the spool 32. It should be understood that in an alternate embodiment of the present embodiment, the bump knob 60 can be integrally molded as part of the spool 32 if so desired by a manufacturer.

A spring 62 is provided between the spool 32 and the housing 12. The spring 62 biases the spool 32 downwardly within the housing 12. To help prevent the spring 62 from wearing against the spool 32, an optional wear plate 64 can be provided between the spool 32 and the spring 62.

Figure 5:
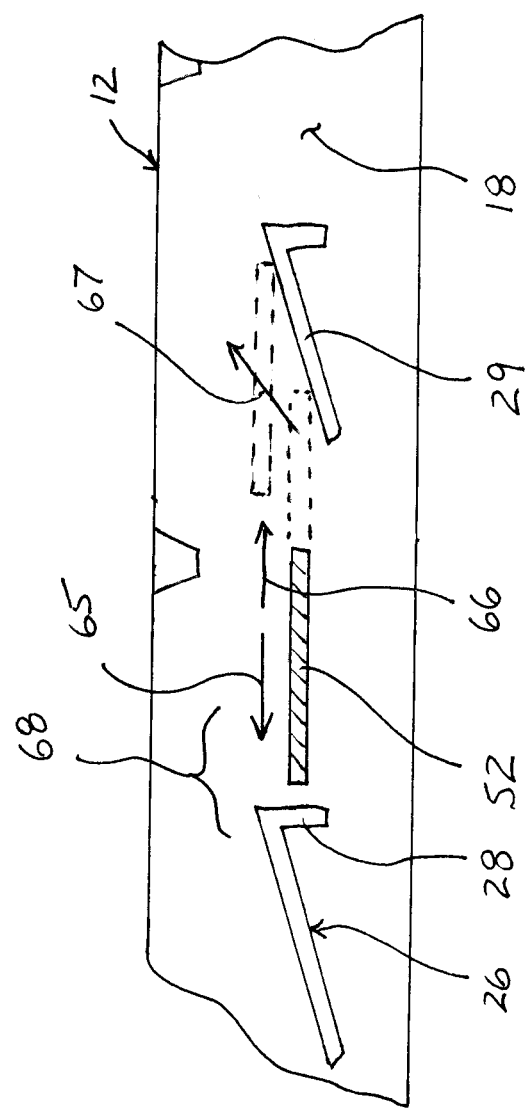
FIG. 5 is a schematic showing the relative operation of a ratcheting mechanism during a winding process.

Referring now to FIG. 5 in conjunction with FIGS. 2, 3 and 4, it will be understood that when the trimmer head assembly 10 is fully assembled, the cog projections 52 on the top flange 36 of the spool 32 rest at the same elevation as do the ramp projections 26 on the inside cylindrical wall 18 of the housing 12. When in this first position, if the spool 32 is turned in the direction of arrow 65, the cog projections 52 contact the vertical segment 28 of the ramp projections 26. This contact stops any further rotation of the spool 32 in the direction of arrow 65. When the spool 32 is rotated in the opposite direction of arrow 66, the cog projections 52 contact the sloped segment 29 of the ramp projections 26. This contact stops any further rotation of the spool 32 in the direction of arrow 66. Accordingly, the spool 32 cannot rotate significantly in either the clockwise direction or the counterclockwise direction when the spool 32 is in its first position. Since the spool 32 is locked in position and prevented from rotating either clockwise or counterclockwise, it should be understood that the spool 32 and housing 12 can be used on a string trimmer machine that rotates the trimmer head either clockwise or counterclockwise. The present invention trimmer head 10 should therefore be recognized as being bi-direction.

The spool 32 is biased into its first position by the spring 62. It will be understood that when the trimmer head assembly 10 is not in use, a person can push upwardly on the spool 32 against the bias of the spring 62. If that person also rotates the spool in the direction of arrow 66 within the housing 12, new trimmer line can be added to the trimmer head assembly 10. As the spool 32 is manually rotated in the direction of arrow 66, the cog projections 52 contact and ride up the sloped segments 29 in the direction of arrow 67. This movement up the sloped segments 29 slightly compressing the spring 62. This raises the entire spool 32 within the housing 12 to a second position. Although the resistance increases slightly, a person can continue to rotate the spool 32 in the direction of arrow 66. The interaction of the cog projections 52 and the ramp projections 26 creates a ratcheting mechanism 68. The ratcheting mechanism 68 enables the spool 32 to rotate indefinitely in the direction of arrow 66 and prevents rotation in the opposite direction of arrow 65.

In the exemplary embodiment, the direction of sloped segments 29 slope upwardly from left to right in FIG. 5. Since the trimmer head assembly 10 is bidirectional, it will be understood that the shape of the ramp projections 26 can be reversed so that the sloped segments 26 slope in the opposite direction. The operation of the ratcheting mechanism 68 remains the same. The direction of the ramp projections 26 is a matter of design choice to the manufacturer.

Referring back to FIGS. 1-4, it will be understood that in order to load trimmer line into the trimmer head assembly 10, either one or two lengths of trimmer line 45, 46 are provided. The spool 32 is manually rotated until the feed-line conduits 48, 49 on the central flange 40 align with the string ports 20 in the housing 12. If one length of trimmer line 45 is provided, the trimmer line 45 is inserted into one string port 20, through the central flange 40 of the spool 32 and out the opposite port. The trimmer line 45 is pulled through the trimmer head assembly 10 until roughly equal amounts of trimmer line 45 are present on either side of the trimmer head assembly 10. The spool 32 is then rotated by grasping and turning the tabs 56 at the bottom of the spool 32. As the spool 32 rotates, the spool 32 winds half of the trimmer line 45 in the upper winding chamber 42 and the other half of the trimmer line 45 in the lower winding chamber 44. By winding the trimmer line 45 into separate winding chambers 42, 44, all problems associated with line twisting and entanglement are removed.

If two separate lengths of trimmer line 45, 46 are provided, as is illustrated, then each length of trimmer line 45, 46 is inserted into a different line-feed conduit and into opposite sides of the central flange 40 of the spool 32. Within each of the feed-line conduits 48, 49 is a configuration for receiving anchoring and securing the ends of the trimmer lines 45, 46. In this manner, the ends of the trimmer lines 45, 46 rotate with the spool 32 therein allowing the trimmer lines 45, 46 to wind onto the spool 32. The spool 32 is then rotated by grasping and turning the tabs 56 at the bottom of the spool 32. As the spool 32 rotates, the spool 32 winds one length of trimmer line 45 into the upper winding chamber 42 and the other length of trimmer line 46 into the lower winding chamber 44. By winding the trimmer lines 45, 46 into separate winding chambers 42, 44, all problems associated with line twisting and entanglement are removed.

Using either one length of line or two lengths of line, it can be seen that the trimmer line can be quickly wound onto the spool 32 without any disassembly of the trimmer head assembly 10. New trimmer line can therefore be added without tools in a simple and easy to understand procedure.

Figure 6:
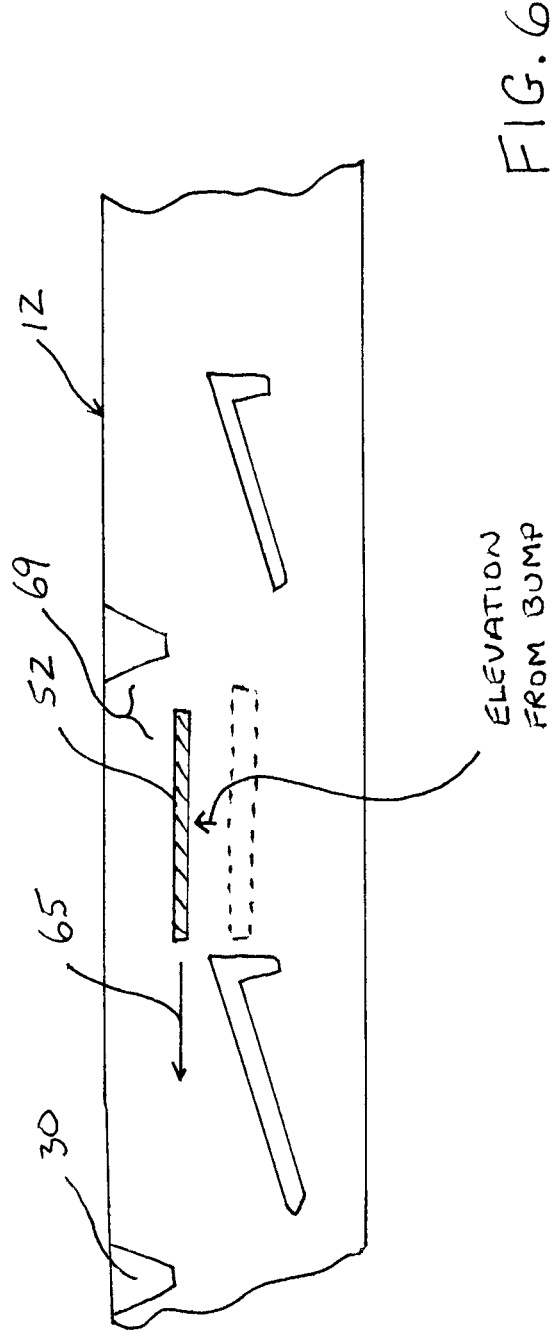
FIG. 6 is a schematic showing the relative operation of a ratcheting mechanism during an unwinding process.

In operation, the trimmer head assembly 10 rotates at high speeds. Eventually, the trimmer lines 45, 46 break or wear away. To advance needed trimmer line off the spool 32, the bump knob 60 is impacted against a ground surface while the trimmer head assembly 10 is spinning. Referring to FIG. 6 in conjunction with FIG. 2, it can be seen that when the bump knob 60 is impacted, the spool 32 is driven up into the housing 12 against the bias of the spring 62. At this momentary second position, the cog projections 52 raise above the ramp projections 26, wherein the spool 32 rotates in the direction of arrow 65. This enables trimmer lines 45, 46 to index and unwind from the spool 32. Each cog projection 52 is prevented from over rotation by the stop projections 30. The cog projections 52 contact the stop projections 30 and are stopped from rotating further. The ramp projections 26 and the stop projections 30 therefore combine with the cog projections 52 to create an indexing mechanism 69 that enables a small length of trimmer line to be released from the spool 32. The bias from the spring 62 then returns the cog projections 52 of the spool 32 to the first position, where the cog projections 52 are at the same level as the ramp projections 26 and all rotation of the spool 32 is restricted.

Figure 7:
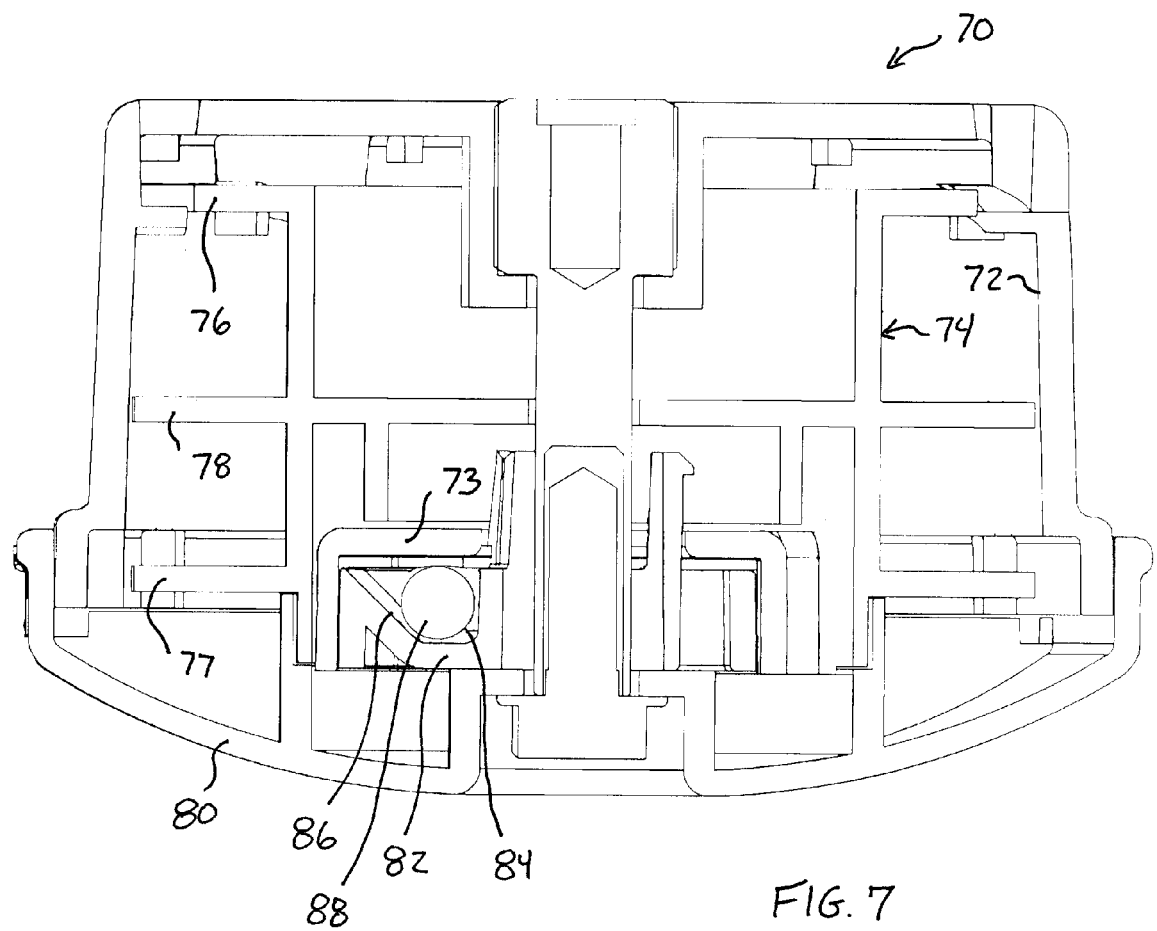
FIG. 7 is a cross-sectional view of an alternate embodiment of a trimmer head assembly with a spool in a first position.
Figure 8:
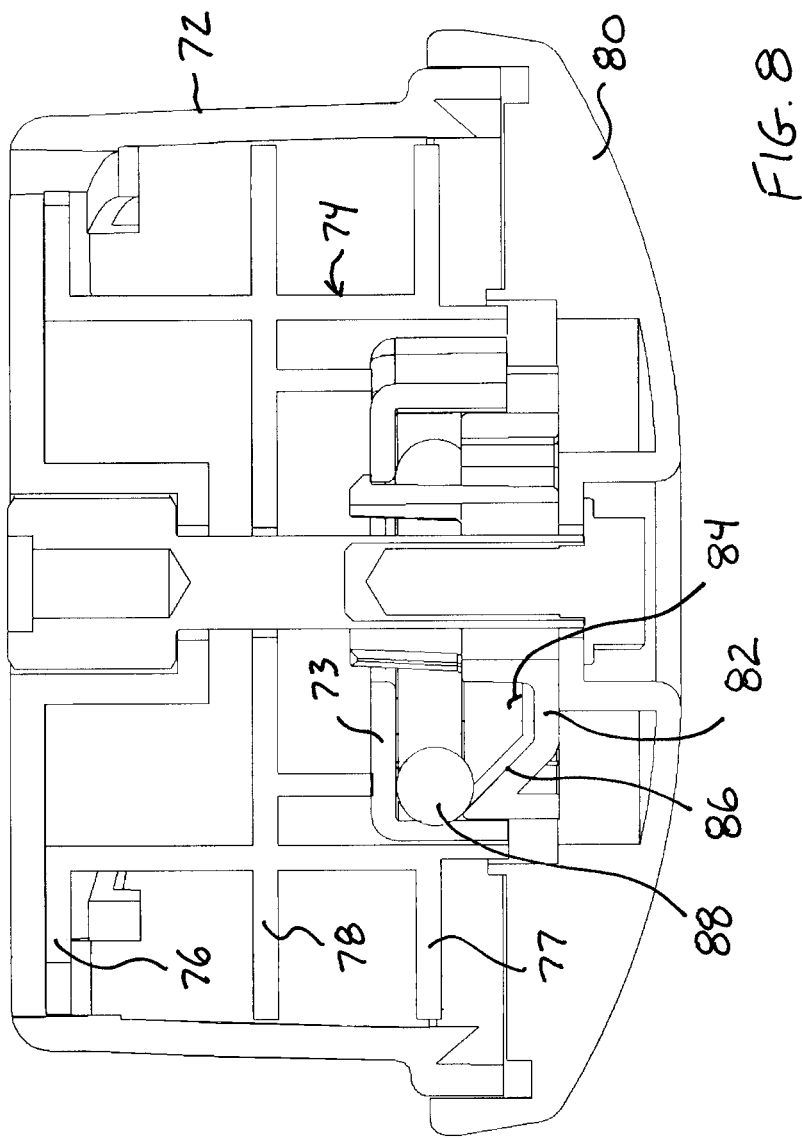
FIG. 8 is a cross-sectional view of an alternate embodiment of a trimmer head assembly with a spool in a second position.

In the embodiment of FIGS. 1-6, the trimmer lines 45, 46 are dispensed from the spool 32 by impacting the bump knob 60 at the bottom of the spool 32. However, the same advantages of design can also be engineered into an autofeed trimmer head design. Referring now to FIG. 7 and FIG. 8, an auto-feed trimmer head assembly 70 is illustrated. The trimmer head assembly 70 generally has the same housing 72 as has previously been described. Furthermore, the spool 74 has a top flange 76, a central flange 78 and a bottom flange 77 that are similar to that previously described. Although not shown, it will be understood that the top flange 76 and the housing 72 are part of the same ratcheting mechanism and the same indexing mechanism as was described as part of the first embodiment.

In the embodiment of FIGS. 7-8, a base plate 80 is provided in place of a bump knob. The base plate 80 supports a centrifuge tray 82. A plurality of depressions 84 are formed into the centrifuge tray 82. Each depression 84 has a sloped outer wall 86. A ball bearing 88 is present within each depression 84. When the trimmer head assembly 70 is spinning normally, the centrifugal forces experienced by the ball bearings 88 are insufficient to bias the ball bearings 88 against the tray cap 73.

The tray cap 73, therefore, does not presses against the spool 74 with enough force to raise the spool 74 within the housing 72 from the first position shown in FIG. 7 to the second position shown in FIG. 8. The spool 74 remains in its first position. Consequently, the cog projections on the top flange of the spool 74, remain locked between ramp projections as was previously described in reference to FIG. 5.

As the trimmer line wears away, the rotational speed of the trimmer head assembly 70 increases due to the decrease in effective diameter and conservation of angular momentum. Once the trimmer head assembly 70 reaches a predetermined threshold rotational velocity, the resulting centrifugal forces are sufficient enough to cause the ball bearings 88 to raise the tray cap 72 against the spool 74 with enough force to raise the spool. This condition is shown in FIG. 8. Once the spool 74 is raised, the spool 74 can index and unwind a short length of trimmer line. The trimmer line increases the effective diameter of the trimmer head assembly 70 and causes it to slow. The trimmer head assembly 70, therefore, results back to its original condition.

There are multiple variations of the described autofeed mechanism that can be used to momentarily raise a spool in a trimmer housing when a trimmer line becomes too short. Many such variations are capable of being adapted for use as part of the present invention.

In the exemplary embodiment of FIG. 7 and FIG. 8 a beneficial secondary effect is also achieved. In the embodiment of FIGS. 7-8, it is understood that the trimmer head assembly 70 will automatically dispense line if the trimmer line were to become too short. However, the trimmer head assembly 70 can also operate as a bump-feed trimmer head. If the base plate 80 were impacted against the ground, the base plate would drive the entire centrifuge tray 82 upwardly. The tray cap 72 presses against the spool 74 and the spool 74 is raised from its first position of FIG. 7 into its second position of FIG. 8. Once in the second position of FIG. 8, the spool 74 indexes, and a short length of trimmer line is released.

It will therefore be understood that the embodiment of the present invention exemplified by FIGS. 7 and 8 operates both as an automatic feed trimmer head and as a bump-feed trimmer head.

It will be understood that the embodiments of the present invention that are illustrated and described are merely exemplary and that a person skilled in the art can make many variations to those embodiments. For instance, the number of cog projections, ramp projections and stop projections can be varied provided the numbers for these elements remain equal. Likewise, the shape of the bump knob, the shape of the housing and the shape of the spool can be varied into numerous configurations that are not illustrated. All such embodiments are intended to be included within the scope of the present invention as defined by the claims.

What is claimed is:

1. A method of configuring a bidirectional trimmer head assembly for use with a trimmer, comprising:
providing a trimmer head housing having an upper end and having a wall defining an interior chamber for receiving a spool;
providing said upper end with a lock for rotationally locking the trimmer head housing to a trimmer shaft for rotating 360 degrees about a trimmer central axis of the trimmer head housing and for rotating said bidirectional trimmer head housing in the clockwise direction about the trimmer central axis when said trimmer rotates in said clockwise direction and for rotating said trimmer head housing in the counterclockwise direction about the trimmer central axis when the trimmer shaft rotates in the counterclockwise direction;
providing said trimmer head housing with string openings defined therein for admitting trimmer line from the interior chamber to the area outside of the trimmer head housing;
providing said spool with a hub formed about a spool central axis of the spool and with a top flange that radially extends from said hub in a first plane that is perpendicular to said spool central axis, said spool being configured to rotate selectively in both said clockwise and counterclockwise direction about said spool central axis independent of said trimmer head housing rotation direction when said spool is not in interfering alignment with the trimmer housing;
providing said trimmer head assembly with a bidirectional ratchet mechanism between said trimmer head housing and said spool, said ratchet mechanism comprising a top flange on said spool having a plurality of spaced cog projections that extend therefrom, and a plurality of ramp projections on said cylindrical housing that extend into said interior chamber of said trimmer head housing;
biasing said spool into a first spool axial position spaced apart axially from said trimmer upper end wherein said cogs and said ramps are axially aligned within the interior chamber such that rotation of said spool relative to the trimmer head housing in a first direction within said interior chamber to a first rotation position causes at least one of said cogs to strike at least one of said ramps preventing further rotation of the spool relative to the trimmer head housing in the first direction, and wherein rotation of said spool relative to the trimmer head housing in a second direction opposite said first direction within said interior chamber to a second rotation position causes at least one of said cogs to strike at least one of said ramps preventing further rotation of the spool relative to the trimmer head housing in the second direction of the spool relative to the trimmer head housing when said spool is in said first spool axial position.

2. The method according to claim 1, wherein said ramp projections of said ratchet mechanism selectively engage and lock said spool to said trimmer head housing in one of the first rotation position of the second rotation position to drive said spool to rotate in fixed engagement with said trimmer head housing when said trimmer head housing rotates in the clockwise direction and when said trimmer head rotates in the counterclockwise direction.

3. The method according to claim 1, wherein each of said plurality of ramp projections has a vertical segment and a segment sloped relative to the trimmer central axis.

4. The method according to claim 1, wherein said step of providing a spool includes providing a spool having a separate first and second winding chambers, wherein said first and second winding chambers having a wall defined therebetween.

5. The method according to claim 1, wherein said step of providing a spool includes providing a spool with a center flange and a bottom flange, wherein a first winding chamber is defined between said top flange and said central flange, and a second winding chamber is defined between said central flange and said bottom flange.

6. The method according to claim 5, wherein said step of providing a spool includes providing at least first and second line-feed conduits in said central flange.

7. The method according to claim 6, further including the step of winding trimmer line onto said spool by extending trimmer line into said first and second line-feed conduits and rotating said spool in a first direction.

8. The method according to claim 2, further including the step of providing an activation mechanism for momentarily moving said spool axially along the trimmer central axis from said first spool axial position in fixed engaged with said trimmer head housing to a second spool axial position wherein said spool cog can rotate about the trimmer central axis unengaged with the trimmer head housing, therein enabling said spool to rotate selectively in the clockwise direction and in the counterclockwise direction relative to said trimmer head housing with said cogs passing over the ramps without the cogs striking the ramps.

9. The method according to claim 8, wherein said activation mechanism is a bump knob selectively coupled to and uncouple from said spool, wherein said bump knob pushes said spool from said first spool axial position toward said second spool axial position when impacted.

10. The method according to claim 1, further comprising:
providing a plurality of stop projections within trimmer head housing interior chamber between said ramps and said upper end of said trimmer housing, wherein said stop projections are positioned axially and radially spaced apart from ramps to allow said spool to rotate selectively clockwise and counterclockwise relative to said trimmer head housing to allow trimmer line to be fed out of said string openings regardless of the direction of rotation of the trimmer housing when said spool is moved axially away from said first spool axial position.

11. The method according to claim 3, wherein rotation of said spool relative to said trimmer head housing about said trimmer central axis in a first spool direction causes said at least one of said cog projections to contact said vertical segment of at least one of said ramp projections to limit the amount of trimmer line fed out of said string openings during rotation of said spool relative to said housing, and wherein rotation of said spool about said trimmer central axis in a direction opposite to said first spool direction relative to said trimmer head housing causes said at least one of said cog projections to contact said sloped segment of at least one of said ramp projections when said spool is in said first spool axial position.

12. The method of claim 11, wherein contact of at least one cog with said sloped section of at least one of said ramp projections when said head is rotated by said trimmer drive shaft prevents further relative rotation of said spool relative to said trimmer head housing when said spool is in said first spool axial position.

13. The method of claim 3, wherein application of an external torque above a predetermined amount on a portion of said spool extending below the lowermost portion of the trimmer head housing selectively rotates said spool relative to said trimmer head housing and causes said spool to move axially towards said upper surface of said trimmer head to a second spool axial position as at least one of said cogs follows said sloped portion of at least one of said ramp projections,
wherein when said spool is in said second spool axial position, rotation of said cog in the clockwise or counterclockwise will allow said cog to pass over at least one of said ramps without striking the ramp and without the ramp interfering with the rotation of the spool relative to the housing.

14. The method of claim 13, wherein further rotation of said spool relative to said trimmer head housing about said trimmer central axis at said second spool axial position causes at least one of said cogs to contact at least one of said stop projections, preventing further rotation of said spool relative to said trimmer head housing when said spool is at said second spool axial position to control the amount of relative motion between said spool and said trimmer head housing and to control the amount of trimmer line fed from said spool out of said string openings.

15. The method according to claim 6, further including the step of providing an activation mechanism for momentarily moving the spool along the axis of trimmer rotation from the first spool axial position fixedly engaged with said trimmer head housing to a second spool axial fixed position with said spool cogs not in axial alignment with said trimmer housing ramps with the trimmer head housing spool from, therein enabling said spool to rotate clockwise or counterclockwise direction about said axis of trimmer rotation.

16. A method of configuring a bidirectional trimmer head assembly for use with a trimmer, comprising:
providing a trimmer head housing having an upper end and a wall defining an interior chamber for receiving a spool;
affixing said upper end of the trimmer head housing to a trimmer shaft for rotating 360 degrees about a trimmer central axis of the trimmer head housing for selectively rotating said bidirectional trimmer head housing in the clockwise direction about said trimmer central axis when said trimmer rotates in said clockwise direction and for rotating said trimmer head housing in the counterclockwise direction about said trimmer central axis when the trimmer shaft rotates in the counterclockwise direction;
providing said trimmer head housing with string openings defined therein for admitting trimmer line from the interior chamber to the area outside of the trimmer head housing;
providing said spool with a hub formed about a spool central axis of the spool, said spool being configured to rotate selectively in both said clockwise and counterclockwise direction about said spool central axis independent of said trimmer head housing rotation direction when said spool is a position that is not in interfering alignment with the trimmer housing;
providing said trimmer head assembly with a bidirectional ratchet mechanism between said trimmer head housing and said spool for selectively controlling the relative motion of the spool relative to the trimmer head housing;
said ratchet mechanism having at least one cooperating ramp and follower forming said ratchet mechanism, one of said at least one ramp and said at least one follower being mounted on said spool or on said trimmer head housing;
biasing said spool into a first spool axial position spaced apart axially from said trimmer upper end wherein said at least one follower and said at least one ramp are axially aligned within the interior chamber such that rotation of said spool relative to the trimmer head housing in a first direction within said interior chamber to a first rotation position causes said at least follower to strike said at least one of said ramp preventing further rotation of the spool relative to the trimmer head housing in the first direction when said spool is in said first spool axial position.

17. The method according to claim 16, wherein said at least one ramp has a segment parallel to said trimmer central axis and a segment sloped relative to the trimmer central axis.

18. The method according to claim 17, wherein rotation of said spool relative to said trimmer head housing about said trimmer central axis in a first spool direction causes said at least one follower to contact said vertical segment of said at least one ramp to limit the amount of trimmer line fed out of said string openings during rotation of said spool relative to said housing at least one cooperating ramp, and wherein rotation of said spool about said trimmer central axis in a direction opposite to said first spool direction relative to said trimmer head housing causes said at least one follower to contact said sloped segment of said at least one ramp projections.

19. The method of claim 18, wherein application of an external torque above a predetermined amount on a portion of said spool selectively rotates said spool relative to said trimmer head housing and causes said spool to move axially towards said upper surface of said trimmer head to a second spool axial position as said at least one follower follows along said sloped portion of at least one of said ramp projections.

20. The method of claim 19, further comprises:
providing a plurality of stop projections within trimmer head housing interior chamber between said ramps and said upper end of said trimmer housing, wherein said stop projections are positioned axially and radially spaced apart from ramps to allow said spool to rotate selectively clockwise and counterclockwise relative to said trimmer head housing to allow trimmer line to be fed out of said string openings regardless of the direction of rotation of the trimmer housing;
wherein further rotation of said at least one follower past said at least one ramp about said trimmer central axis at said second spool axial position causes said at least one follower to contact at least one of said stop projections, preventing further rotation of said spool relative to said trimmer head housing when said spool is at said second spool axial position to control the amount of relative motion between said spool and said trimmer head housing and to control the amount of trimmer line fed from said spool out of said string openings.

21. The method according to claim 20, further including the step of providing an activation mechanism for momentarily moving said spool axially along the trimmer central axis from said first spool axial position in fixed engaged with said trimmer head housing to said second spool axial position wherein said a cog on said spool is out of axial alignment with a respective ramp on said trimmer head housing and can rotate about the trimmer central axis unengaged with the trimmer head housing, therein enabling said spool to rotate past said trimmer head housing ramp in the clockwise direction and in the counterclockwise direction relative to said trimmer head housing;
wherein said activation mechanism is a bump knob coupled to said spool, wherein said bump knob pushes said spool from said first spool axial position toward said second spool axial position when impacted.

22. The method according to claim 16, further including the step of providing an activation mechanism for momentarily converting the bidirectional ratcheting mechanism from a one way ratchet mode to a two way ratchet mode;
said bidirectional ratcheting mechanism ramp having a first vertical wall and a second sloped wall for allowing the cog to move past the ramp along the slope wall with the application of a first amount of torque in one rotational direction and preventing the cog from moving past the vertical wall with application of the first amount of torque in the opposite rotational direction when said spool is in the first spool axial position to define a one way ratchet mode;
wherein the bidirectional ratcheting mechanism is converted to a two way ratchet mode when said spool is moved by the activation mechanism axially along the trimmer central axis from the first spool axial position to a second spool axial position with said cog out of axial alignment with the ramps wherein said spool cog can rotate about the trimmer central axis unengaged with the trimmer head housing past at least one ramp in both directions, therein enabling said spool to rotate in the clockwise direction and in the counterclockwise direction relative to said trimmer head housing to define a two way ratchet mode.

* * * * *